F. A. JAYNE.
ROTARY ENGINE.
APPLICATION FILED SEPT. 14, 1907.

902,883.

Patented Nov. 3, 1908.

3 SHEETS—SHEET 1.

Witnesses

Inventor
Frank A. Jayne
James J. Anderson
Attorney

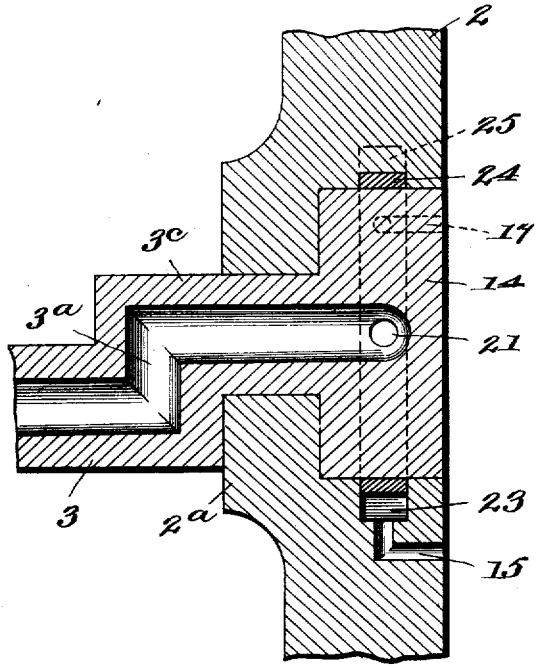
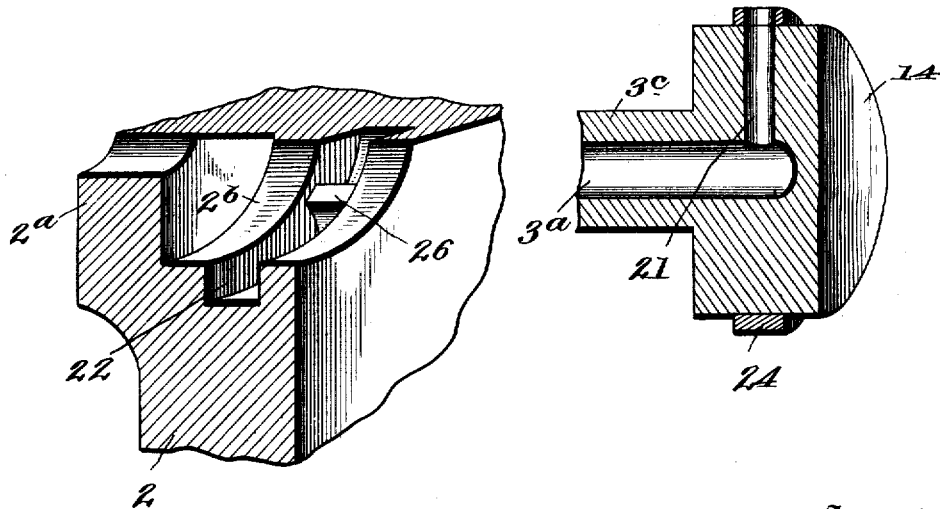

UNITED STATES PATENT OFFICE.

FRANK A. JAYNE, OF AUBURN, NEW YORK.

ROTARY ENGINE.

No. 902,883.     Specification of Letters Patent.     Patented Nov. 3, 1908.

Application filed September 14, 1907. Serial No. 392,848.

*To all whom it may concern:*

Be it known that I, FRANK A. JAYNE, a citizen of the United States, residing at Auburn, in the county of Cayuga and State of New York, have invented certain new and useful Improvements in Rotary-Cylinder Engines, of which the following is a specification.

My invention relates to rotary engines, and more particularly to that type in which the cylinder itself revolves.

The object of the invention is to produce an engine of this character in which the steam may be used expansively, and which shall have but few parts, and be simple and efficient in operation.

With the above and other objects in view, my invention consists in the construction and arrangement hereinafter described and illustrated in the accompanying drawings, in which:—

Figure 1:
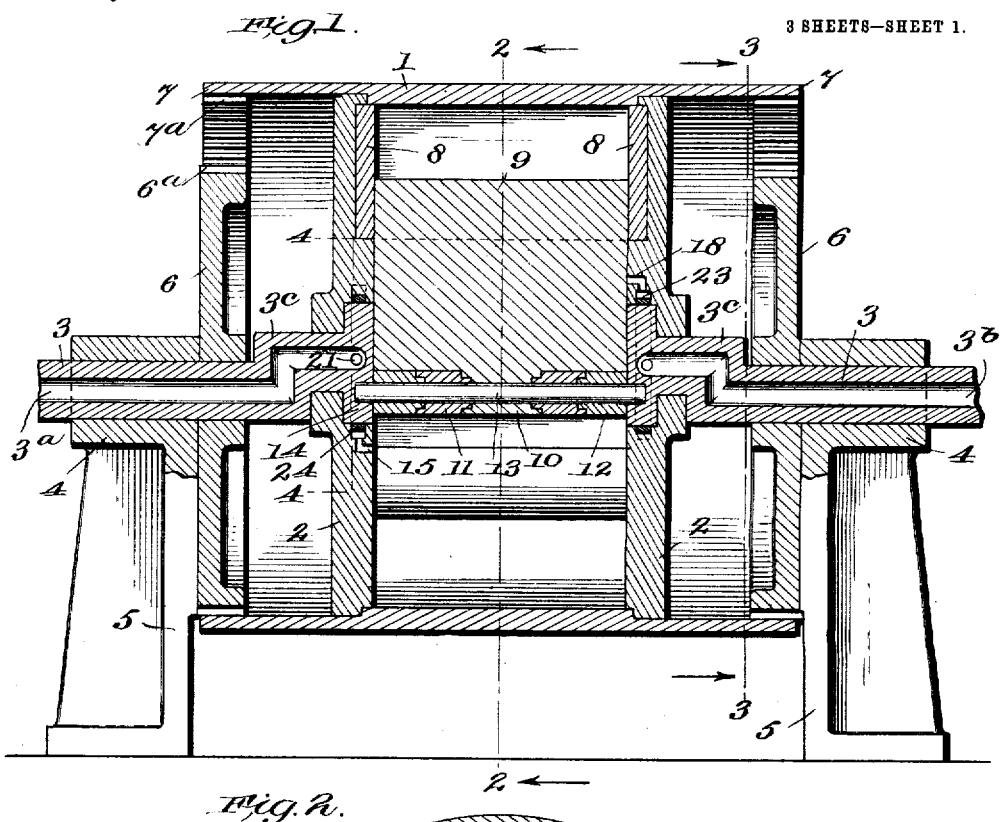
Figure 2:
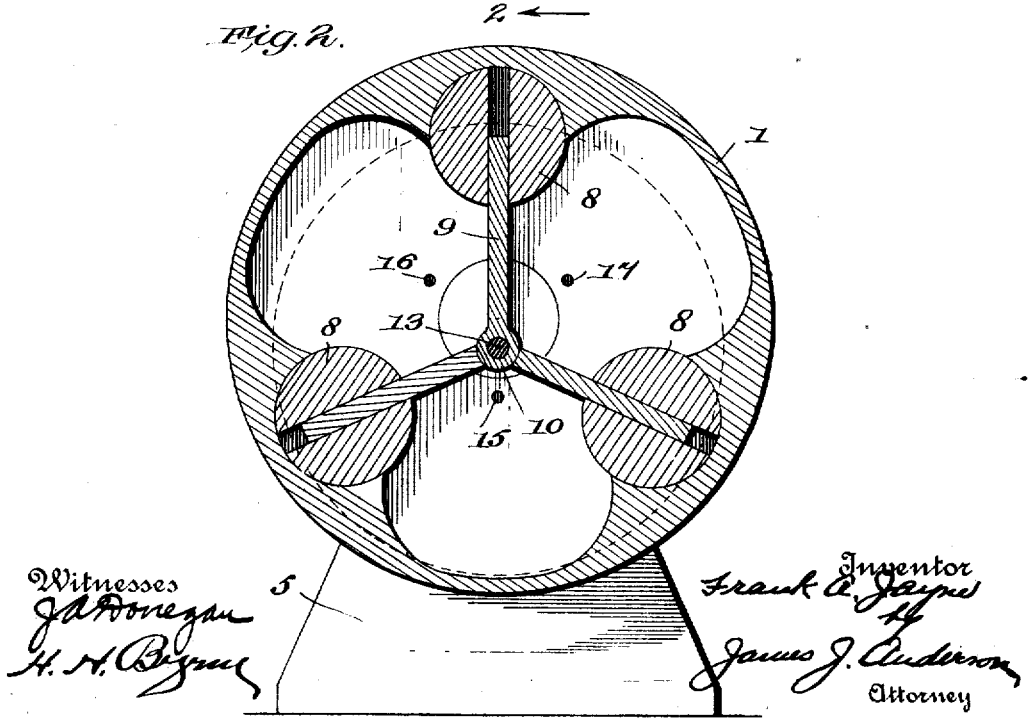
Figure 3:
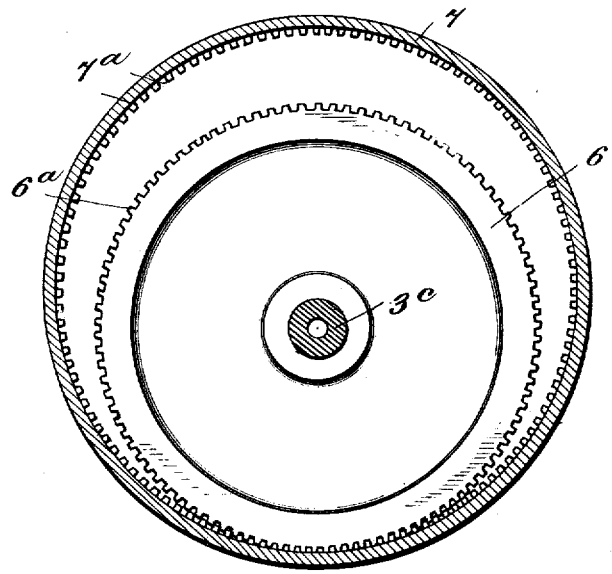
Figure 4:
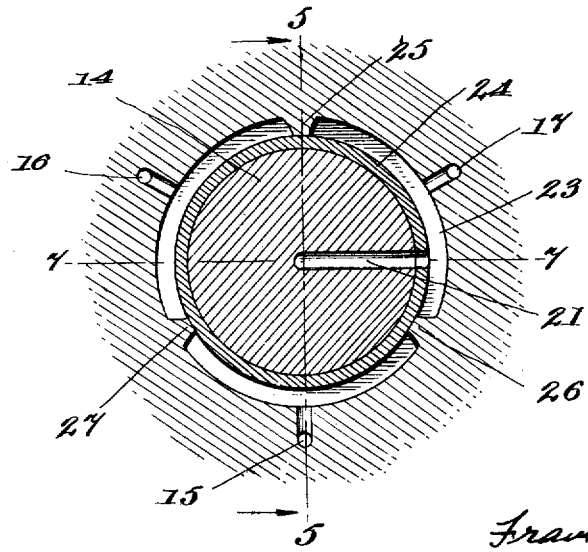

Figure 1 is a central longitudinal section through the engine complete. Fig. 2 is a transverse section thereof, taken on the line 2— of Fig. 1. Fig. 3 is a section on the line 3—3 of Fig. 1, looking in the direction of the arrow. Fig. 4 is an enlarged sectional view of the valve mechanism taken substantially on the line 4—4, Fig. 1. Fig. 5 is a sectional view on line 5—5, Fig. 4, looking in the direction of the arrow. Fig. 6 is a fragmentary perspective of part of the casing, showing the valve seat. Fig. 7 is a sectional perspective of the valve member, the section being substantially on the line 7—7, of Fig. 4.

Referring to the drawings in detail, 1 represents the cylinder of the engine, provided with heads 2, tightly secured thereto. This cylinder is supported for rotation by means of a hollow crank shaft, 3, mounted in journal boxes 4, carried by pedestals 5, or other suitable frame work.

Rigidly secured to each journal box 4, is a circular member, 6, having on its periphery, teeth, 6ª, and which I shall refer to hereinafter as a "geared abutment".

The cylinder 1 is formed outside the heads 2 with extensions 7, provided internally with gear teeth, 7ª arranged to mesh with the geared abutment, 6. The construction and relation of these parts is clearly shown in Fig. 3.

9 represents the pistons, preferably three in number, pivotally mounted at one end, by means of sleeves, 10, 11, 12, on a shaft 13, supported by the shaft 3 in line with the crank where it passes through the journal boxes. At the other end, the pistons are arranged to slide in slots formed in cylindrical blocks 8, mounted to oscillate in the heads, 2, of the cylinder, 1.

It will be noted that on the inside of the abutments 6 the shaft 3 is formed with crank or offset portions, 3ᶜ. These project through the walls of the casing 2, and carry on their inner ends, valve members, 14, in which the shaft 13 is eccentrically mounted. The casing 2 is suitably recessed to receive these valve members, as shown at 2ᵇ, (Fig. 6.) Formed in each of these valve members is a single port or passage, 21, 22, connecting respectively with the passages 3ª, 3ᵇ formed in the crank shaft, and extending radially out through the periphery of the valve members. As clearly shown in Figs. 5 and 7 this valve member, 14, consists of a cylindrical block, having secured to its periphery a packing ring 24, through which the port 21 extends. An annular recess or chamber 23 is formed in the casing 2, around the valve seat, and is adapted to receive the packing ring 24, which ring partially fills the chamber, and fits tightly around the sides thereof. Located in this annular groove or recess are a number of, preferably three, partitions, 25, 26, 27, secured to and preferably formed integral with the casing 2. As clearly shown in Figs. 4 and 6, these partitions project radially inward from the bottom of the groove, but are not as long as the depth of the groove. They therefore abut against the periphery of the packing ring, and thus divide the space between this ring and the bottom of the groove into three equal parts. (See Fig. 4.) From each of these three spaces, extends a port, 15, 16, 17, connecting them with the corresponding chamber into which the three pistons divide the cylinder.

The operation of the engine is as follows:— One end of the shaft 3, say 3ª, serves as the steam supply pipe, while the other end acts as exhaust. Steam enters the passage 3ª and passes thence through port 21, which we will suppose to be in the position shown in Fig. 4. The steam then fills space of groove 23 between the partitions 25 and 26, and flows through port 17, into the chamber formed between two of the pistons 9 and the cylinder. In other words, steam fills one third of the cylinders. It will be observed that, owing to the crank formation of the shaft 3, the cylinder is eccentric with respect to the shaft 13, carrying the pistons, and therefore the steam pressure in the chamber connected with port 17 (Fig. 2) will act on pistons of unequal areas, and thus cause the cylinder to move. As it does so, the teeth 7ª engage the teeth 6ª on the fixed geared abutment 6, and the cylinder is thus forced to roll around the abutment, moving bodily in a circular path. As the partition 26 moves past the port 21, communication is established with the space between partitions 26 and 27, and thus with the second expansion chamber between the pistons. At the same time, the first chamber has been brought into communication with the port 18, leading to the exhaust pipe, and thus the steam escapes therefrom. Thus the valve member 14 automatically shifts the steam supply into successive chambers of the engine as the cylinder is made to roll around the geared abutment 6. Therefore it will be seen that a rotary motion is imparted to the shaft 3, from which power is taken. It will be observed that the cylinder and pistons both move together, and co-act with a geared fixed abutment, to produce rotation of a crank shaft, on which the cylinder is eccentrically mounted.

In order to reverse the engine, it is only necessary to interchange the supply and exhaust connections, as is obvious. In other words, to cause the engine to run in a reverse direction to that described, it would only be necessary to supply steam through the passage 3ᵇ and use 3ª for the exhaust.

What I claim is:—

1. In a rotary steam engine, a hollow shaft, pistons mounted concentrically of said shaft, and a cylinder coöperating with said pistons, rotatably mounted on said shaft eccentrically thereof.

2. In a rotary steam engine, a crank shaft, a cylinder mounted on the cranks of said shaft, said crank shaft being hollow and forming the steam supply and exhaust connections for said cylinder and journal boxes supporting said shaft.

3. In a rotary steam engine, a cylinder and coöperating piston, both of which are rotatable, said cylinder being provided with gear teeth, and a fixed geared abutment with which said cylinder meshes.

4. In a rotary steam engine, a cylinder and coöperating piston, both of which are movable, and a fixed geared abutment with which said cylinder meshes, said cylinder embracing said abutment, but mounted eccentrically thereof.

5. In a rotary steam engine, a cylinder mounted on a crank shaft so as to move bodily in a circular path, and a fixed geared abutment with which said cylinder coöperates.

6. In a rotary steam engine, a cylinder mounted so as to permit of its bodily movement in a circular path, and a fixed geared abutment, coöperating therewith, said cylinder embracing, but mounted eccentrically of said abutment.

7. In a rotary steam engine, a crank shaft, a cylinder mounted thereon, means for supplying steam to said cylinder, and a fixed geared abutment of circular form mounted concentrically with said shaft, but eccentrically to said cylinder.

8. In a rotary steam engine, a cylinder, a crank shaft journaled in the center of the heads thereof, and means for supplying steam to said cylinder and causing the same to move bodily in a circular path, whereby rotary motion is imparted to said shaft.

9. In a rotary steam engine, a cylinder, a shaft having cranks, the ends of which are journaled in the heads of said cylinder and whereby said cylinder is supported, fixed geared abutments mounted concentric with said shaft, and teeth formed on the inside of said cylinder and meshing with said abutment.

10. In combination a shaft having cranks, a cylinder movably supported by said cranks, its axis being in line therewith, but out of line with said shaft, and a plurality of pistons arranged within said cylinder on a common center, said pistons being substantially radially disposed, but eccentrically mounted, and a fixed geared abutment with which said cylinder coöperates, whereby a rotary motion, is imparted to said shaft.

11. In a rotary steam engine, a shaft, a steam receiving chamber supported by said shaft but mounted eccentrically thereto, and a fixed abutment adapted to be engaged by the walls of said chamber, whereby a rotary motion is imparted to said shaft.

12. In a rotary steam engine, a shaft, a circular fixed abutment mounted concentrically therewith, a cylinder carried by said shaft but arranged eccentrically thereto, and adapted, when steam is admitted thereto, to roll around said fixed abutment, and thus impart a rotary motion to said shaft.

13. In a rotary steam engine, a movable casing, a circular recess in a wall thereof, a cylindrical block swiveled in said recess, a steam pipe connecting with this block, an annular recess in said wall, surrounding said block, a radial port in said block connecting said pipe with said annular recess, and a port connecting said recess with the interior of said casing.

14. In a rotary steam engine, a casing divided into a plurality of chambers, a circular recess in the wall of said casing, a cylindrical block swiveled in said recess and carrying on its periphery a packing ring, an annular recess formed within said first recess for receiving said ring, but of greater depth than the ring, partitions, corresponding in number to said chambers, projecting radially into said annular recess and abutting against said ring, a steam port in said block, and steam ports extending from the space between each two adjacent partitions to the respective chamber in the casing.

In testimony whereof I affix my signature, in presence of two witnesses.

FRANK A. JAYNE.

Witnesses:
G. EARLE TREAT,
JAMES J. ANDERSON.